(12) United States Patent
Shimada et al.

(10) Patent No.: US 6,406,105 B1
(45) Date of Patent: Jun. 18, 2002

(54) BRAKE SYSTEM OF HYBRID TYPE VEHICLE HAVING FRONT AND REAR REGENERATION BRAKES OF DIFFERENT EFFICIENCIES

(75) Inventors: Michihito Shimada; Satoru Niwa, both of Susono; Junich Sakamoto, Gotemba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/676,933

(22) Filed: Oct. 2, 2000

(30) Foreign Application Priority Data

Dec. 9, 1999 (JP) .......................................... 11-349849

(51) Int. Cl.⁷ ................................................ B60T 8/64
(52) U.S. Cl. ...................................... 303/152; 280/65.1
(58) Field of Search ............................ 303/152, 9.61, 303/9.76; 180/233, 242, 65.1

(56) References Cited

U.S. PATENT DOCUMENTS

| | | | |
|---|---|---|---|
| 5,148,883 A | * 9/1992 | Tanaka et al. ............... 180/165 |
| 5,234,262 A | * 8/1993 | Walenty et al. ............. 303/111 |
| 5,253,929 A | * 10/1993 | Ohori ............................. 303/3 |
| 5,549,172 A | 8/1996 | Mutoh et al. ............... 180/65.1 |
| 5,615,933 A | * 4/1997 | Kidston et al. ............. 303/152 |
| 5,757,153 A | * 5/1998 | Ito et al. ...................... 318/370 |
| 5,853,229 A | 12/1998 | Willmann et al. ............. 303/3 |
| 5,895,100 A | 4/1999 | Ito et al. ...................... 303/152 |
| 6,099,089 A | * 8/2000 | Schneider ................... 303/152 |

FOREIGN PATENT DOCUMENTS

| | | |
|---|---|---|
| DE | 197 03 061 A1 | 7/1997 |
| DE | 196 04 134 A1 | 8/1997 |
| JP | 9-93711 | 4/1997 |

* cited by examiner

*Primary Examiner*—Paul N. Dickson
*Assistant Examiner*—Xuan Lan Nguyen
(74) *Attorney, Agent, or Firm*—Oliff & Berridge, PLC

(57) ABSTRACT

In a brake system of a hybrid type vehicle equipped with a front regeneration brake workable at a first regeneration efficiency, a rear regeneration brake workable at a second regeneration efficiency different from the first regeneration efficiency, a front friction brake, a rear friction brake and a control device for operating the front and rear regeneration brakes and the front and rear friction brakes, when the vehicle is braked at a controlled braking force, either of the front and rear regeneration brake workable at a higher regeneration efficiency than the other applies as much a braking force to the corresponding front or rear wheels as available thereby under a condition that a ratio of a braking force applied to the rear wheels to a braking force applied to the front wheels is not larger than a value predetermined therefor, with a remainder of the controlled braking force, if any, being applied by at least one of the other of the front and rear regeneration brakes and the front and rear friction brakes.

8 Claims, 3 Drawing Sheets

BRAKE SYSTEM OF HYBRID TYPE VEHICLE HAVING FRONT AND REAR REGENERATION BRAKES OF DIFFERENT EFFICIENCIES

BACKGROUND OF THE INVENTION

1. Field of the Invention

The present invention relates to a brake system of a vehicle such as an automobile, and more particularly, to a brake system of a hybrid type vehicle equipped with an internal combustion engine and a motor-generator as drive power means thereof.

2. Description of the Prior Art

The hybrid type vehicles are spotlighted in these years under the apprehension of the fuel resource exhaustion and the atmospheric pollution. In the hybrid type vehicles currently under developments, a motor-generator is incorporated so as to operate as a motor for driving the vehicle when supplied with an electric current from a battery and as a generator for charging the battery when driven by the kinetic energy of the vehicle. It is generally at the time of braking the vehicle that the motor-generator is operated as the generator.

In an aspect of driving four-wheeled vehicles for various desired performances, it will not always be desired that the front and rear wheels are both driven or equally driven, as the rear drive cars or the front drive cars are really quite common, while in an aspect of regenerating as much an electric energy as possible from the kinetic energy of four-wheeled vehicles during the braking thereof, it will generally be desired that the front and rear wheels are both equipped with the regeneration brakes.

On the other hand, in the motor-generators for use with the hybrid type vehicles, the balance between the performance or efficiency in operation as a motor and the performance or efficiency in operation as a generator will widely change according to the design and/or size or capacity thereof.

SUMMARY OF THE INVENTION

In view of the above, it is expected that, when separate motor-generators are provided for a pair of front wheels and a pair of rear wheels in a hybrid type vehicle, the regeneration efficiency of the motor-generator for the front wheels and that of the motor-generator for the rear wheels are substantially different from one another according to various designs of the hybrid type vehicles with regard to the driving performance thereof. Much greater will be such a difference when a motor-generator is provided only for a pair of front or rear wheels, while for the other pair of rear or front wheels a mere regeneration brake is provided, because, when the regeneration brake is provided in the form of a motor-generator, the basic assembly of the rotor and the stator is used in common for the motor function and the generator function, and therefore, such a dual function assembly may be designed and manufactured for a higher performance even at a higher manufacturing cost, so that it shows a substantially higher regeneration efficiency than a mere regeneration brake.

In consideration of such a diversity, or diverse probability, in the design and manufacture of the regeneration brakes of the hybrid type vehicles with regard to the regeneration efficiency thereof, it is a primary object of the present invention to provide an improved brake system of a hybrid type vehicle having regeneration brakes for the front and rear wheels, wherein the front and rear regeneration brakes are effectively operated to regenerate as much an amount of electric energy from the kinetic energy of the vehicle as possible during the braking thereof.

According to the present invention, the above-mentioned primary object is accomplished by a brake system of a hybrid type vehicle having a pair of front wheels and a pair of rear wheels, comprising:

front regeneration brake means for selectively braking the front wheels with a regeneration of an electric energy from a kinetic energy of the vehicle at a first regeneration efficiency;

rear regeneration brake means for selectively braking the rear wheels with a regeneration of an electric energy from the kinetic energy of the vehicle at a second regeneration efficiency different from the first regeneration efficiency;

front friction brake means for selectively braking the front wheels;

rear friction brake means for selectively braking the rear wheels; and control means for operating the front and rear regeneration brake means and the front and rear friction brake means such that, when the vehicle is braked at a controlled braking force, either of the front and rear regeneration brake means working at a higher regeneration efficiency than the other apply as much a braking force to the corresponding front or rear wheels as available thereby for the controlled braking force under a condition that a ratio of a braking force applied to the rear wheels to a braking force applied to the front wheels is not larger than a value predetermined therefor, with a remainder of the controlled braking force, if any, being applied by at least one of the other of the front and rear regeneration brake means and the front and rear friction brake means.

In more detail, when the first regeneration efficiency of the front regeneration brake means is higher than the second regeneration efficiency of the rear regeneration brake means, the brake system according to the present invention may be so adapted that the front regeneration brake means apply such a braking force to the front wheels that is the lower of the controlled braking force and a maximum regeneration braking force available thereby, and when the remainder of the controlled braking force is totally applicable to the rear wheels under the condition that the rear/front braking ratio is not larger than the predetermined value, the rear regeneration brake means apply as much a braking force to the rear wheels as available thereby, with a further remainder of the controlled braking force, if any, being applied by at least the front friction brake means to the front wheels.

In such a brake system, the further remainder of the controlled braking force may be applied only to the front wheels by the front friction brake means.

Or, alternatively, in such a brake system, the further remainder of the controlled braking force may be applied to the front and rear wheels by the front and rear friction brake means, respectively, at a ratio such as a front share of the controlled braking force according to the predetermined value of the rear/front braking ratio minus the maximum regeneration braking force available by the front regeneration brake means vs. a rear share of the controlled braking force according to the predetermined value of the rear/front braking ratio minus a maximum regeneration braking force available by the rear regeneration brake means.

According to another detail, when the first regeneration efficiency of the front regeneration brake means is higher than the second regeneration efficiency of the rear regeneration brake means, the front regeneration brake means apply such a braking force to the front wheels that is the lower of the controlled braking force and a maximum braking force available thereby, and when the remainder of the controlled braking force is not totally applicable to the rear wheels under the condition that the rear/front braking ratio is not larger than the predetermined value, the brake system may be so adapted that the front friction brake means apply such a braking force to the front wheels that corresponds to a difference between a front share of the controlled braking force according to the predetermined value of the rear/front braking ratio and the braking force applied to the front wheels by the front regeneration bake means, while the rear regeneration brake means apply as much of a rear share of the controlled braking force according to the predetermined value of the rear/front braking ratio as available thereby to the rear wheels, with a further remainder of the controlled braking force, if any, being applied to the rear wheels by the rear friction brake means.

According to still another detail, when the second regeneration efficiency of the rear regeneration brake means is higher than the first regeneration efficiency of the front regeneration brake means, the rear regeneration brake means may apply as much of a rear share of the controlled braking force according to the predetermined value of the rear/front braking ratio as available thereby to the rear wheels, while the front regeneration brake means may apply as much of a remainder of the controlled braking force as available thereby to the front wheels, with a further remainder of the controlled braking force, if any, being applied by at least the front friction brake means to the front wheels.

In such a brake system, the further remainder may be applied by only the front friction brake means to the front wheels.

Or, alternatively, the further remainder may be applied by the front and rear friction brake means to the front and rear wheels, respectively, at a ratio such as a front share of the controlled braking force according to the predetermined value of the rear/front braking ratio minus a maximum regeneration braking force available by the front regeneration brake means vs. the rear share of the controlled braking force according to the predetermined value of the rear/front braking ratio minus a maximum regeneration braking force available by the rear regeneration brake means.

BRIEF DESCRIPTION OF THE DRAWINGS

In the accompanying drawings.

DESCRIPTION OF THE EMBODIMENTS

In the following, the present invention will be described in more detail with respect to some preferred embodiments with reference to the accompanying drawings.

Figure 1:
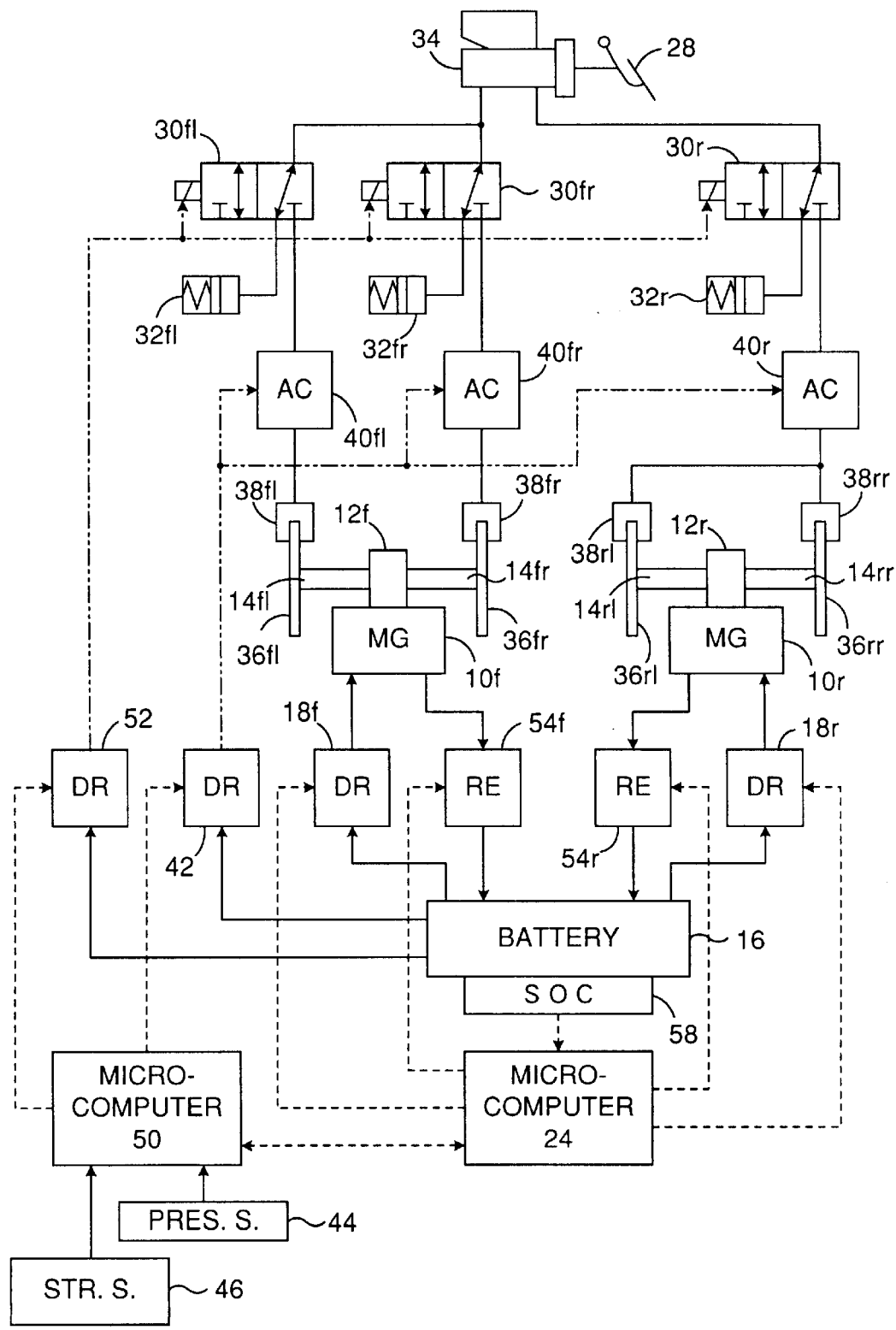
FIG. 1 is a diagrammatical illustration of an embodiment of the brake system of a hybrid type vehicle according to the present invention.

Referring to FIG. 1, 36*fl*, 36*fr*, 36*rl* and 36*rr* are wheels disks of front left, front right, rear left and rear right wheels of a hybrid type vehicle, though the vehicle and the wheels are not shown in the figure. The wheel disks 36*fl* and 36*fr* are respectively rotatably supported by shafts 14*fl* and 14*fr* and are connected with one another via a front differential gear 12*f*, while the wheel disks 36*rl* and 36*rr* are respectively rotatably supported by shafts 14*rl* and 14*rr* and are connected with one another via a rear differential gear 12*r*.

A front motor-generator 10*f* is torque-transmittingly engaged to the front differential gear 12*f*, while a rear motor-generator 10*r* is torque-transmittingly engaged to the rear differential gear 12*r*. Herein it is assumed that the regeneration efficiency of either of the front motorgenerator 10*f* and the rear motor-generator 10*r* is lower than that of the other. This means that it is industrially or commercially desirable to design and/or manufacture the other motor-generator to be of a less regeneration efficiency based upon the balance between the operation performance and the economy of respective hybrid type vehicles. Further, one of the motorgenerators 10*f* and 10*r* which should have a less regeneration efficiency may be replaced by a mere regeneration brake according to the convenience of design of the vehicle. When the regeneration brake is constructed only for the regeneration braking function, in contrast to the motor-generator operative also for the rotational power generating function, it would generally be a matter of course that the regeneration efficiency of the mere regeneration brake is lower than that of the motor-generator, as, for example, the clearance between the rotor and the stator highly influential on the regeneration efficiency may be designed and/or manufactured to be less fine for the mere regeneration brake than for the motor-generator, the latter being generally twice as valuable as the former in function.

38*fl*, 38*fr*, 38*rl* and 38*rr* are wheel cylinders for frictionally braking the wheel disks 36*fl*, 36*fr*, 36*rl* and 36*rr*, respectively. The wheel cylinders 38*fl* and 38*fr* are separately actuated by separate actuators 40*fl* and 40*fr*, while the wheel cylinders 38*rl* and 38*rr* are equally actuated by a common actuator 40*r*.

28 is a brake pedal adapted to be depressed by a driver. When the brake pedal 28 is depressed, a hydraulic fluid in a master cylinder 34 is pressurized. The hydraulic fluid pressure of the master cylinder 34 is directly transmittable to the actuators 40*fl* and 40*fr* via changeover valves 30*fl* and 30*fr*, respectively, while it is also directly transmittable to the actuator 40*r* via a changeover valve 30*r*. The changeover valves 30*fl*, 30*fr* and 30*r* are solenoid-actuated changeover valves which are changed over between a position shown in the figure when a control electric current is supplied thereto, so as to interrupt the direct connection between the master cylinder 34 and the corresponding actuators 40*fl*, 40*fr* and 40*r*, while connecting the master cylinder 34 to corresponding stroke simulators 32*fl*, 32*fr* and 32*r*, and a second position opposite to the first position when no control electric current is supplied thereto, so as to resume the direct connections between the master cylinder and the corresponding actuators.

The changeover of each of the changeover valves 30*fl*, 30*fr* and 30*r* is controlled by a microcomputer 50 via a drive circuit 52. This changeover control is substantially either to connect the master cylinder 34 to the stroke simulators 32*fl*, 32*fr* and 32*r* for the electronic control of the brake system when the computerized brake control is in operation, thereby placing the wheel cylinders 38*fl*–38*rr* under the control of the microcomputer 50 and another microcomputer 24 described hereinbelow, with incorporation of the state of depression of the brake pedal 28 by the driver, or to connect the master cylinder 34 directly to the wheel cylinders 38*fl*–38*rr* when the computerized brake control is shutdown.

The microcomputer 50 is supplied with a signal indicating the mater cylinder pressure from a pressure sensor 44 and a signal indicating a stroke of depression of the brake pedal 28 by the driver from a stroke sensor 46, while it electrically controls the actuators 40fl, 40fr and 40r via a drive circuit 42. Therefore, when the brake system is operating under the control of the microcomputers 50 and 24, the driver's braking operation is executed through detecting operations of the sensors 44 and 46 and a controlling operation of the microcomputer 50.

The motor-generators 10f and 10r are selectively operated as motors for driving the wheels by the electric power of a battery 16 via corresponding drive circuits 18f and 18r placed under the control of the microcomputer 24, while they are also selectively operated as generators for regenerating an electric power from a kinetic energy of the vehicle when a regeneration braking is applied thereto, while charging thereby the battery 16 via corresponding regeneration circuits 54f and 54r placed under the control of the microcomputer 24. The state of charge of the battery 16 is informed to the microcomputer 24 by a state-of-charge meter 58. The microcomputer 24 is functionally connected with the microcomputer 50.

The function of the brake system constructed as shown in FIG. 1 will be described hereinbelow in the form of two operational embodiments thereof.

Figure 2:
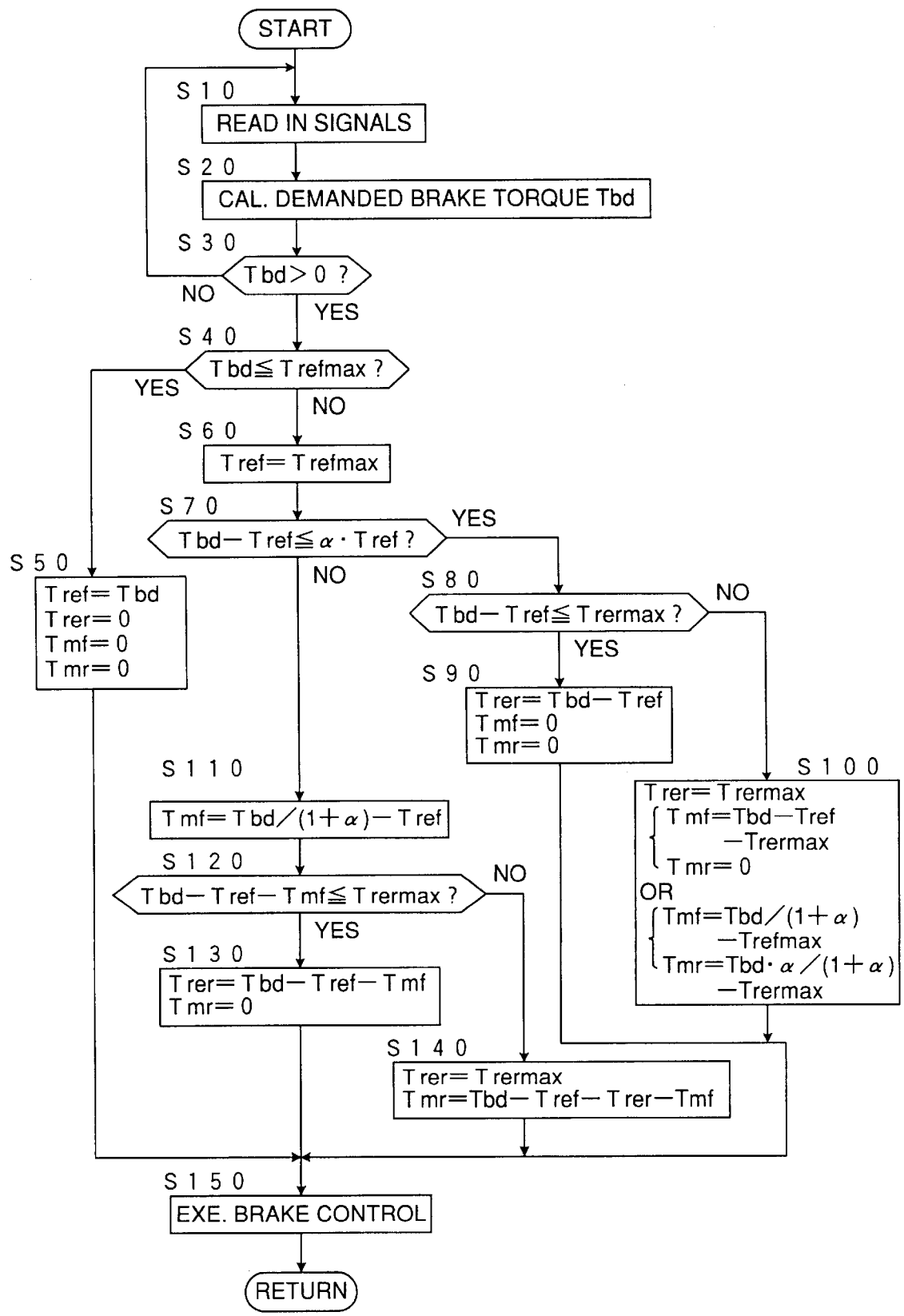
FIG. 2 is a flowchart showing the operation of the brake system shown in FIG. 1 according to a first operational embodiment.

FIG. 2 is a flowchart showing a first such operational embodiment based upon an assumption that the motor-generator 10f regenerates an electric power from the kinetic energy of the vehicle at a higher regeneration efficiency than the motor-generator 10r. In this connection, as already noted, although the brake system shown in FIG. 1 has two motor-generators 10f and 10r for the front and rear wheels, the brake system according to the present invention may operate with only one motor-generator provided for the front wheels or the rear wheels, particularly for the front wheels in the present first operational embodiment, with a mere regeneration brake being provided for the rear wheels, based upon such an assumption that the motor-generator is designed and/or manufactured for a higher precision thereby affording a higher regeneration efficiency than a mere regeneration rake when obtained at the same cost for the same regeneration braking effect.

When the brake system was put into operation by an engine key switch not shown in the figure being turned on, in step 10, signals for various parameters including the master cylinder pressure from the pressure sensor 44, the brake pedal depression from the stroke sensor 46 and others such as vehicle speed, etc. are read in by the microcomputer 50.

In step 20, a brake torque Tbd demanded by the driver is calculated based upon the read-in data. This demanded torque Tbd represents a controlled braking force to be applied to the vehicle by the brake system.

Then in step 30, it is judged if Tbd is larger than zero. When the answer is yes, the control proceeds to step 40, while when the answer is no, the control returns before step 10.

In step 40, it is judged if Tbd is equal to or smaller than a maximum brake torque Trefmax available by the regenerating function of the front motor-generator 10f. When the answer is yes, the control proceeds to step 50, and a target regeneration brake torque Tref for the front motor-generator 10f, a target regeneration brake torque Trer for the rear motor-generator 10r, a target friction brake torque Tmf for the front wheel cylinders 39fl and 38fr, and a target friction brake torque Tmr for the rear wheel cylinders 38rl and 38rr are set to Tbd, 0, 0 and 0, respectively, so that the braking function is totally loaded on the regeneration braking by the front motor-generator 10f working at a high regeneration efficiency, so that the kinetic energy of the vehicle during a braking is regenerated as an electric energy to a greatest extent available. The target value Tmf may be deemed as a mean value of target friction brake torques for the wheel cylinders 38fl and 38fr, because the braking forces applied to the wheel cylinders 38fl and 38fr may be controlled to be different from one another for a running behavior control of the vehicle executable by the microcomputer 50 or 24 by a corresponding software being loaded therein.

When the answer of step 40 is no, the control proceeds to step 60, and the target regeneration brake torque Tref for the front motor-generator 10f is set to the maximum regeneration brake torque Trefmax available by the motor-generator 10f. Then in step 70, it is judged if Tbd−Tref, i.e. a remainder of the demanded brake torque Tbd, is equal to or smaller than $\alpha \cdot$Tref, i.e. a product of Tref and a limit value $\alpha$ predetermined for the ratio of the brake torque applied to the rear wheels to the brake torque applied to the front wheels. The limit value $\alpha$ is generally determined to be smaller than 1, so that the rear wheels are less braked than the front wheels, in order to avoid a side slip of the rear wheels due to a braking. As well known in the art, when the vehicle is braked, the load on the front wheels increases, while the load on the rear wheels decreases, due to the running inertia of the vehicle. Therefore, the so-called friction circle representing the frictional force available between the wheel and the road surface is smaller in the rear wheels than in the front wheels in proportion to the forward shifting of the load, thereby rendering the rear wheels less stable against a side slip, as the lateral component of the frictional force available only within the friction circle decreases according to an increase of the longitudinal component thereof due to a braking.

When the answer of step 70 is yes, the control proceeds to step 80, and it is judged if the remainder Tbd−Tref is equal to or smaller than a maximum brake torque Trermax available by the regenerating function of the rear motor-generator 10r. When the answer is yes, the control proceeds to step 90, and the target regeneration brake torque Trer of the rear motor-generator 10r is set to the remainder Tbd−Tref, with the target friction brake torques Tmf and Tmr for the wheel cylinders 38fl, 38fr and 38fr, 38rr being both set to 0.

When the answer of step 80 is no, the control proceeds to step 100, and the target regeneration brake torque Trer of the rear motor-generator 10r is set to Trermax, while a further remainder of the demanded brake torque, i.e. Tbd−Tref−Trermax, is imposed on the front wheel cylinders 38fl and 38fr by setting the target friction brake torque Tmf for the front wheels to Tbd−Tref−Trermax, with the target friction brake torque Tmr for the rear wheel cylinders 38rl and 38rr being set to 0. Or, alternatively, the further remainder may be shared by the front and rear wheels cylinders according to the rear/front braking ratio $\alpha$, such that Tmf is set to Tbd/(1+$\alpha$)−Trefmax, while Tmr is set to Tbd$\cdot\alpha$/(1+$\alpha$)−Trermax.

When the answer of step 70 is no, the control proceeds to step 110, and the target friction brake torque Tmf for the front wheel cylinders $38_{fl}$ and 38fr is set to Tbd/(1+$\alpha$)−Tref, i.e. a front share of the demanded brake torque Tbd according to the predetermined value of the rear/front braking ratio $\alpha$ minus the front regeneration brake torque Tref applied by the front motor-generator 10f.

Then in step 120, it is judged if Tbd−Tref−Tmf, i.e. a remainder of the demanded brake torque Tbd to be applied to the rear wheels with holding the rear/front braking ratio not to exceed the predetermined value α, is equal to or smaller than the maximum regeneration brake torque Trermax available by the rear motor-generator 10r. When the answer is yes, the control proceeds to step 130, and the target regeneration brake torque Trer for the rear motor-generator 10r is set to Tbd−Tref−Tmf, while the target friction brake torque Tmr for the rear wheel cylinders 38rl and 38rr is set to 0.

When the answer of step 120 is no, the control proceeds to step 140, and the target regeneration brake torque Trer is set to the maximum regeneration brake torque Trermax available by the rear motor-generator 10r, while the target friction brake torque Tmr for the rear wheel cylinders 38rl and 38rr is set to Tbd−Tref−Trer−Tmf.

After step 50, 90, 100, 130 or 140, the control proceeds to step 150, and the brake control is executed according to Tref, Trer, Tmf and Tmr obtained as described above.

Figure 3:
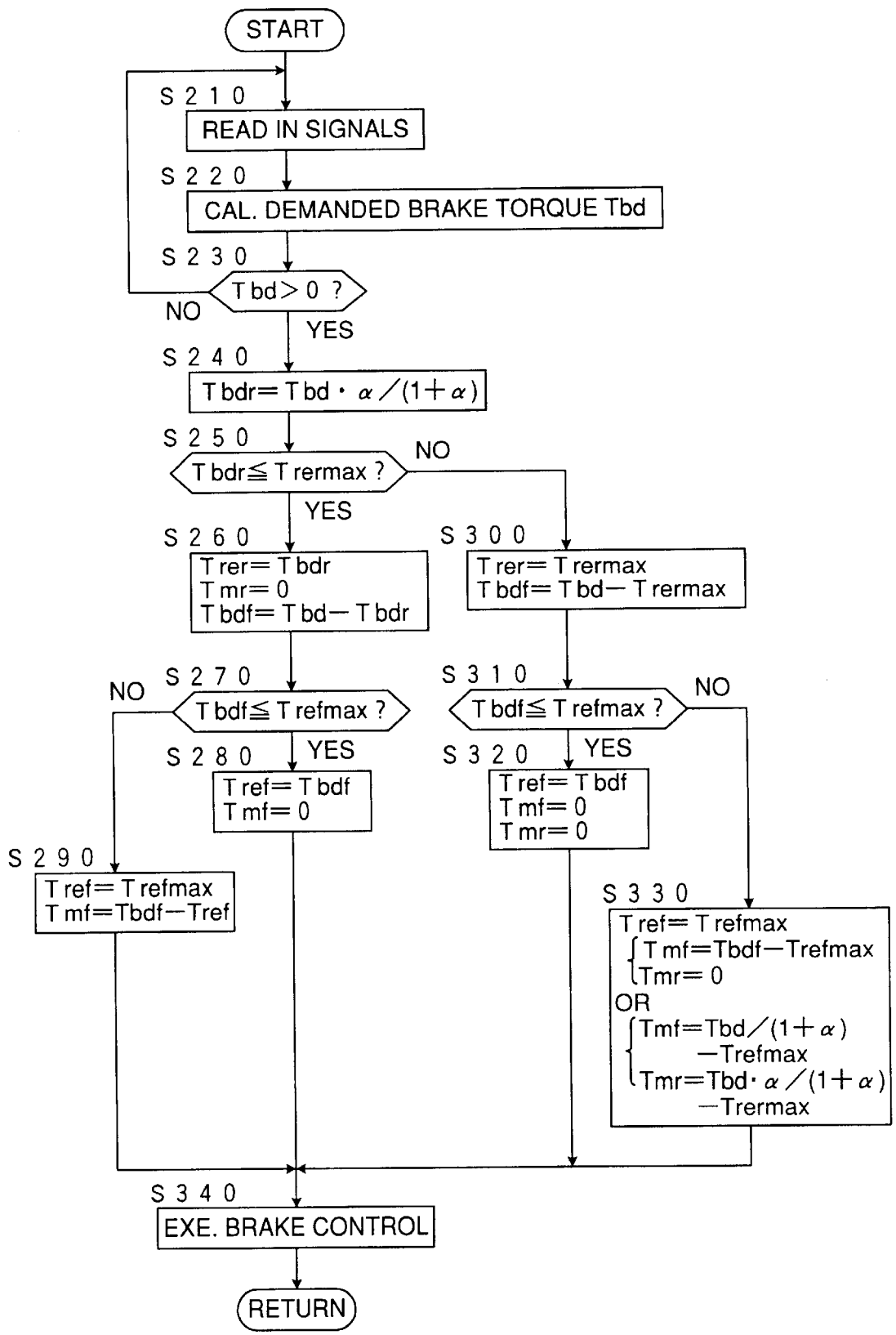
FIG. 3 is a flowchart showing the operation of the brake system shown in FIG. 1 according to a second operational embodiment.

FIG. 3 is a flowchart showing a second operational embodiment based upon an assumption that, in the brake system shown in FIG. 1, the regeneration efficiency of the motor-generator 10r is higher than that of the motor-generator 10f. In this connection, as already noted with, respect to the first operational embodiment shown in FIG. 2, the motor-generator 10f working at a lower regeneration efficiency may be a mere regeneration brake.

In the flowchart of FIG. 3, steps 210, 220 and 230 correspond to steps 10, 20 and 30 of the flowchart of FIG. 2, respectively, and operate in the same manner as in FIG. 1. When the answer of step 230 is yes, the control proceeds to step 240.

In step 240, a rear share Tbdr of the demanded brake torque Tbd to be applied to the rear wheels is calculated according to the rear/front braking ratio to be such as Tbd·α/(1+α). When the rear motor-generator 10r operates at a higher regeneration efficiency than the front motor-generator 10f, the brake system is controlled such that the rear motor-generator 10r operates with priority as much for the regeneration braking as allowable by the restrictive condition imposed by the rear/front braking ratio that it should not exceed the value α predetermined therefor.

Then in step 250, it is judged if the rear share Tbdr of the demanded brake torque Tbd is equal to or smaller than the maximum regeneration torque Trermax available by the rear motor-generator 10r. When the answer is yes, the control proceeds to step 260, and the target regeneration brake torque Trer for the rear motor-generator 10r is set to Tbdr, while the target friction brake torque Tmr for the wheel cylinders 38rl and 38rr is set to 0, and a front share Tbdf of the demanded brake torque Tbd to be applied to the front wheels is calculated as Tbd−Tbdr. Then in step 270, it is judged if the front share Tbdf is equal to or smaller than the maximum regeneration torque Trefmax available by the front motor-generator 10f.

When the answer is yes, the control proceeds to step 280, and the target regeneration brake torque Tref for the front motor-generator 10f is set to Tbdf, while the target friction brake torque Tmf for the front wheel cylinders 38fl and 38fr is set to 0. On the other hand, when the answer of step 270 is no, the control proceeds to step 290, and Tref is set to Trefmax, while Tmf is set to Tbdf−Tref.

When the answer of step 250 is no, the control proceeds to step 300, and the target regeneration torque Trer for the rear motor-generator 10r is set to the maximum regeneration torque Trermax available thereby, while a front share Tbdf of the demanded brake torque to be applied to the front wheels is calculated as Tbd−Trermax. Then the control proceeds to step 310.

In step 310, it is judged if the front share Tbdf is equal to or smaller than the maximum regeneration torque Trefmax available by the front motor-generator 10f. When the answer is yes, the control proceeds to step 320, and the target regeneration torque Tref for the front motor-generator 10f is set to Tbdf, while the target friction torques Tmf and Tmr for the front and rear wheel cylinders 38fl, 38fr, 38rl and 38rr are both set to 0.

When the answer of step 310 is no, the control proceeds to step 330, and the target regeneration torque Tref for the front motor-generator 10f is set to the maximum regeneration torque Trefmax available thereby, while the target friction torque Tmf for the front wheel cylinders 38fl and 38fr is set to Tbdf−Trefmax, with the target friction torque Tmr for the rear wheel cylinders 38rl and 38rr being set to 0. Or, alternatively, Tmf and Tmr may be set to Tbd/(1+α)−Trefmax and Tbd·α/(1+α)−Trermax, respectively, so that the remainder of the demanded brake torque Tbd not applicable by the front and rear motor-generators 10f and 10r is shared for the front and rear wheel cylinders according to the rear/front braking ratio α.

After step 280, 290, 320 or 330, the control proceeds to step 340, and the brake control is executed according to Tref, Trer, Tmf and Tmr obtained as described above.

Although the present invention has been described in detail with respect to some preferred embodiments thereof, it will be apparent for those skilled in the art that various modifications are possible with respect to the shown embodiments within the scope of the present invention.

What is claimed is:

1. A brake system of a hybrid type vehicle having a pair of front wheels and a pair of rear wheels, comprising:

front regeneration brake means for selectively braking the front wheels with a regeneration of an electric energy from a kinetic energy of the vehicle at a first regeneration efficiency;

rear regeneration brake means for selectively braking the rear wheels with a regeneration of an electric energy from the kinetic energy of the vehicle at a second regeneration efficiency different from the first regeneration efficiency;

front friction brake means for selectively braking the front wheels;

rear friction brake means for selectively braking the rear wheels; and control means for operating the front and rear regeneration brake means and the front and rear friction brake means such that, when the vehicle is braked at a controlled braking force, either of the front and rear regeneration brake means working at a higher regeneration efficiency than the other apply as much a braking force to the corresponding front or rear wheels as available thereby for the controlled braking force under a condition that a ratio of a braking force applied to the rear wheels to a braking force applied to the front wheels is not larger than a value predetermined therefor, with any remainder of the controlled braking force, being applied by at least one of the other of the front and rear regeneration brake means and the front and rear friction brake means.

2. A brake system according to claim 1, wherein the first regeneration efficiency of the front regeneration brake means is higher than the second regeneration efficiency of the rear regeneration brake means, so that the front regeneration brake means apply such a braking force to the front wheels that is the lower of the controlled braking force and a maximum braking force available thereby, and when the remainder of the controlled braking force is totally applicable to the rear wheels under the condition that the rear/front braking ratio is not larger than the predetermined value, the rear regeneration brake means apply as much a braking force to the rear wheels as available thereby, with a further remainder of the controlled braking force, if any, being applied by at least the front friction brake means to the front wheels.

3. A brake system according to claim 2, wherein the further remainder of the controlled braking force is applied only to the front wheels by the front friction brake means.

4. A brake system according to claim 2, wherein the further remainder of the controlled braking force is applied to the front and rear wheels by the front and rear friction brake means, respectively, at a ratio such as a front share of the controlled braking force according to the predetermined value of the rear/front braking ratio minus the maximum regeneration braking force available by the front regeneration brake means vs. a rear share of the controlled braking force according to the predetermined value of the rear/front braking ratio minus a maximum regeneration braking force available by the rear regeneration brake means.

5. A brake system according to claim 1, wherein the first regeneration efficiency of the front regeneration brake means is higher than the second regeneration efficiency of the rear regeneration brake means, so that the front regeneration brake means apply such a braking force to the front wheels that is the lower of the controlled braking force and a maximum braking force available thereby, and when the remainder of the controlled braking force is not totally applicable to the rear wheels under the condition that the rear/front braking ratio is not larger than the predetermined value, the front friction brake means apply such a braking force to the front wheels that corresponds to a difference between a front share of the controlled braking force according to the predetermined value of the rear/front braking ratio and the braking force applied to the front wheels by the front regeneration bake means, while the rear regeneration brake means apply as much of a rear share of the controlled braking force according to the predetermined value of the rear/front braking ratio as available thereby to the rear wheels, with a further remainder of the controlled braking force, if any, being applied to the rear wheels by the rear friction brake means.

6. A brake system according to claim 1, wherein the second regeneration efficiency of the rear regeneration brake means is higher than the first regeneration efficiency of the front regeneration brake means, so that the rear regeneration brake means apply as much of a rear share of the controlled braking force according to the predetermined value of the rear/front braking ratio as available thereby to the rear wheels, while the front regeneration brake means apply as much of a remainder of the controlled braking force as available thereby to the front wheels, with a further remainder of the controlled braking force, if any, being applied by at least the front friction brake means to the front wheels.

7. A brake system according to claim 6, wherein the further remainder is applied by only the front friction brake means to the front wheels.

8. A brake system according to claim 6, wherein the further remainder is applied by the front and rear friction brake means to the front and rear wheels, respectively, at a ratio such as a front share of the controlled braking force according to the predetermined value of the rear/front braking ratio minus a maximum regeneration braking force available by the front regeneration brake means vs. the rear share of the controlled braking force according to the predetermined value of the rear/front braking ratio minus a maximum regeneration braking force available by the rear regeneration brake means.

\* \* \* \* \*